US006204420B1

(12) United States Patent
Miller et al.

(10) Patent No.: US 6,204,420 B1
(45) Date of Patent: Mar. 20, 2001

(54) SYNERGISTIC MIXTURES OF PHOSPHORIC ESTERS WITH CARBOXYLIC ACIDS OR CARBOXYLIC ACID DERIVATIVES AS ASPHALTENE DISPERSANTS

(75) Inventors: Dennis Miller, Kelkheim; Axel Vollmer, Kriftel; Michael Feustel, Köngernheim; Peter Klug, Grossostheim, all of (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/338,966

(22) Filed: Jun. 24, 1999

(30) Foreign Application Priority Data

Jun. 25, 1998 (DE) ............................................. 198 28 352

(51) Int. Cl.$^7$ ................................ C07C 7/20; C07F 9/09; E21B 43/22
(52) U.S. Cl. ............................... 585/4; 208/309; 208/22; 166/270.1; 507/929; 507/267; 558/81
(58) Field of Search ................................ 208/48 AA, 22, 208/309; 507/930, 931, 936, 929, 267; 166/270.1; 585/4

(56) References Cited

U.S. PATENT DOCUMENTS

| 4,414,035 | 11/1983 | Newberry et al. ................. 134/3 |
| 6,063,146 | * 5/2000 | Miller et al. ..................... 44/437 |

FOREIGN PATENT DOCUMENTS

| 1142114 | 3/1983 | (CA) . |
| 2029465 | 5/1991 | (CA) . |
| 2075749 | 2/1993 | (CA) . |
| 3511760 | 10/1986 | (DE) . |
| 196 42 494 | 4/1998 | (DE) . |
| 197 08 499 | 9/1998 | (DE) . |
| 0198225 | 10/1986 | (EP) . |
| WO 93/13294 | 7/1993 | (WO) . |
| WO 94/18430 | 8/1994 | (WO) . |

OTHER PUBLICATIONS

European Search Report.
"Asphaltene Stabilization in Alkyl Solvents Using Oil–Soluble Amphiphiles," by C.L. Chang and H.S. Fogler, SPE Paper No. 25185 (1993).
"An Evaluation of New Asphaltene Inhibitors: Laboratory Study and Field Testing," by M.N. Bouts, R.J. Wiersma, H.M. Muijs, and A.J. Samuel, J. Pet. Technol. 47(9), 1995, pp. 782–787.
Industrial Applications of Surfactants III, D. Karsa (Ed.) p. 247.
Derwent Patent Family Report and/or Abstracts.

* cited by examiner

*Primary Examiner*—Bekir L. Yildirim
(74) *Attorney, Agent, or Firm*—Miles Dearth; Scott E. Hanf

(57) ABSTRACT

The invention relates to a synergistic mixture of

A from 5 to 99% by weight of a carboxylic acid having more than 4 carbon atoms, an ethercarboxylic acid containing $C_{18}$–$C_{22}$-alkyl, $C_{18}$–$C_{22}$-alkenyl or $C_6$–$C_{18}$-alkylaryl substituents, an amidocarboxylic acid, or mixtures thereof, B from 1 to 95% by weight of a phosphoric mono- or diester, or mixtures thereof, which is substituted by $C_{18}$–$C_{22}$-alkyl, $C_{18}$–$C_{22}$-alkenyl, $C_6$–$C_{18}$-alkylaryl or alkoxylated groups, where the sum of components A and B is 100% by weight, to crude oils containing such mixtures, and to a process for dispersing asphaltenes in crude oils.

9 Claims, No Drawings

SYNERGISTIC MIXTURES OF PHOSPHORIC ESTERS WITH CARBOXYLIC ACIDS OR CARBOXYLIC ACID DERIVATIVES AS ASPHALTENE DISPERSANTS

CROSS-REFERENCES TO RELATED APPLICATIONS

The present invention is described in the German priority application No. 1982835.0, filed Jun. 25, 1998, which is hereby incorporated by reference as is fully disclosed herein.

DESCRIPTION OF THE RELATED ART

Asphaltenes are constituents of crude oils. They contain a multiplicity of structures, especially high-molecular-weight, fused aromatic components containing heteroatoms. In view of the complexity of their chemistry, asphaltenes are described as the oil fraction which is soluble in benzene, but not in n-pentane.

In crude oil, asphaltenes are normally in the form of a colloidal dispersion. This is stabilized by oil resins.

Asphaltenes can precipitate during production, refining, transport and storage of crude oil and products derived therefrom, such as, for example, heavy heating oil, bunker C oil or ship oil. Joint causes of this precipitation are a reduction in temperature or a change in composition (for example evaporation of volatile constituents). Asphaltenes can also precipitate during flow through porous media.

Flooding with $CO_2$ during the conveying process can cause asphaltenes to flocculate or precipitate.

Some oils contain hydrocarbon waxes which precipitate at low temperatures. Interactions between the precipitates of wax and asphaltenes can increase the total amount of precipitated substance or its rate of formation. Precipitated asphaltenes cause problems in the production and during processing of crude oils. Asphaltenes precipitate in valves, pipes and conveying equipment. On hot surfaces, such as, for example, heat exchangers, carbonization of these precipitates can make their removal very difficult. The precipitates reduce the efficiency of plants and, in the worse case, can result in complete blockage and a shutdown in production, which causes high costs.

Heavy oils, which are frequently used to power ships, contain significant amounts of asphaltenes. The precipitation of asphaltenes can result in both poor combustion and problems in handling and storage of the fuel.

Bitumen, heavy oils and residues are sometimes diluted with solvent in order to reduce the viscosity for transport. The handling and/or stability of such oil mixtures can in turn be permanently impaired by precipitation of asphaltenes.

The precipitation of asphaltenes can be prevented or reduced by small amounts of dispersants. These substances exhibit one or more of the following effects:
a) the amount of precipitate is reduced;
b) the precipitate forms more slowly;
c) the precipitate is more finely divided; and
d) the tendency of the precipitate to deposit on surfaces is reduced.

If asphaltene precipitates have already formed, they can be removed using solvents. The addition of a dispersant can improve the effectiveness of these solvents.

A multiplicity of asphaltene dispersants is already known. CA-A-2,029,465 and CA-A-2,075,749 describe alkylphenol-formaldehyde resins in combination with hydrophilic/lipophilic vinyl polymers. Various carboxylic and sulfonic acids are known as asphaltene dispersants. The asphaltene-dispersing properties of dodecylbenzenesulfonic acid have been described in U.S Pat. No. 4,414,035 and by D.-L. Chang and H. S. Fogler (SPE paper No. 25185, 1993) and by M. N. Bouts et al. (J. Pet. Technol. 47, 782-7,1995).

The use of phosphoric esters for dispersing asphaltenes is disclosed in DE-A-35 11 760 and CA-A-1,142,114.

The dispersants which have been disclosed hitherto can only partially solve the problems caused by precipitation of asphaltenes. Since oils vary in composition, individual dispersants can only be effective in a restricted range. Sometimes, even small changes in oil composition have a large effect on the asphaltene-dispersing properties. The requisite dosage may then be too high for an economical problem solution. In some cases, the known dispersants are therefore unsatisfactory and additional products are necessary.

The object was therefore to provide novel asphaltene dispersants which do not have the above disadvantages of the dispersants disclosed hitherto.

SUMMARY OF THE INVENTION

It has now been found that the action of asphaltene dispersants based on carboxylic acids can be greatly improved by addition of relatively small amounts of acidic alkylphosphoric esters. This allows such dispersants to be used at lower dosages.

The invention thus relates to a synergistic mixture of

A from 5 to 99% by weight of a carboxylic acid having more than 4 carbon atoms, an ethercarboxylic acid having $C_{18}$–$C_{22}$-alkyl, $C_{18}$–$C_{22}$-alkenyl or $C_6$–$C_{18}$-alkylaryl substituents, an amidocarboxylic acid, or mixtures thereof, B from 1 to 95% by weight of a phosphoric mono- or diester, or mixtures thereof, which is substituted by $C_{18}$–$C_{22}$-alkyl, $C_{18}$–$C_{22}$-alkenyl, $C_6$–$C_{18}$-alkylaryl or alkoxylated groups, where the sum of components A and B is 100% by weight.

DESCRIPTION OF THE PREFERRED EMBODIMENTS

If component A is a carboxylic acid, this preferably contains from 8 to 22, in particular from 12 to 18, carbon atoms. If A is an ethercarboxylic acid of the formula $RO(CH_2CH_2O)_nCH_2COOH$, this may, in a preferred embodiment of the invention, be ethoxylated with up to 20 ethylene oxide units, preferably with from 1 to 10 ethylene oxide units. The amidocarboxylic acids which can be used in component A are preferably sarcosides of the formula

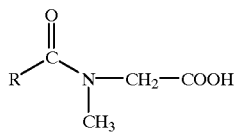

in which R is $C_7$–$C_{21}$-alkyl or -alkenyl, in particular $C_{11}$–$C_{17}$-alkyl or -alkenyl.

Phosphoric esters are generally mixtures of mono-, di- and triesters, the mono- and diesters being acids. The proportion of these components depends on the production route. Phosphoric esters can be prepared from fatty alcohols, ethoxylated fatty alcohols and ethoxylated alkylphenols.

In a preferred embodiment of the invention, the phosphoric ester mentioned as component B has been ethoxylated with up to 20 ethylene oxide units per alkyl radical, preferably with 1–10 ethylene oxide units. Ethoxylated phosphoric esters conform to the formula

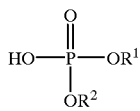

in which $R^1$ is hydrogen or a $(CH_2CH_2O)_n R^3$ group, and $R^2$ is a $(CH_2CH_2O)_m R^4$ group. $R^3$ and $R^4$ are preferably $C_1$–$C_{22}$–alkyl, $C_2$–$C_{22}$–alkenyl or $C_6$–$C_{18}$–alkylaryl. m and n are integers, preferably from 1 to 20, in particular from 1 to 10.

If the phosphoric ester is substituted by alkyl or alkenyl groups, these may be branched or unbranched. Their preferred chain length is between 10 and 20, in particular between 12 and 18, carbon atoms. If the phosphoric ester carries an alkylaryl substituent, this is preferably derived from benzene or naphthalene.

The invention furthermore relates to crude oils and products derived therefrom, containing, as asphaltene dispersants, a synergistic combination of phosphoric esters with carboxylic acids or carboxylic acid derivatives, as described above.

Products derived from crude oils are, for example, heavy heating oil, ship oil or bitumen.

The invention furthermore relates to a process for dispersing asphaltenes in crude oils by adding the novel mixtures.

The novel synergistic mixtures may be combined with other types of asphaltene dispersant, for example with alkylphenol-formaldehyde resins. Alkylphenol-formaldehyde resins can be prepared by acidic or basic catalysis. The acid-catalyzed compounds are predominantly linear, while the base-catalyzed compounds contain a high proportion of cyclic material (see B. Rowan in D. Karsa (Ed.) "Industrial application of surfactants III", p. 247).

The novel synergistic mixture is employed in a concentration of from 0.5 to 10,000 ppm, preferably from 2 to 2000 ppm.

For easier metering, this mixture can be formulated as a solution in an oil-miscible solvent, such as, for example, aromatic hydrocarbons or mixtures of hydrocarbons and an aliphatic alcohol.

Since the novel synergistic mixture is based on a combination of substances, it is less susceptible to a change in the oil composition. This improves its reliability.

EXAMPLES

| Component A | | |
|---|---|---|
| No. | Chemical composition | |
| A1 | Oleylsarcosine | |
| | $C_{17}H_{33}CON(CH_3)CH_2COOH$ | |
| A2 | Ethercarboxylic acid | |
| | $C_{12/14}H_{25/29}(CH_2CH_2O)_{1.8}CH_2COOH$ | |
| A3 | Oleic acid | |
| | $C_{17}H_{33}COOH$ | |
| Component B | | |
| No. | Chemical composition | |
| B1 | Phosphoric ester based on nonylphenol + 4 mol of ethylene oxide | |
| B2 | Mono/diphosphoric ester based on $C_{18}$-guerbet alcohol | |

Examples 1 and 2 demonstrate the synergistic action of mixtures of carboxylic acids and phosphoric esters. At this low concentration, the individual components exhibit no action, but the mixture exhibits a good dispersion action. Further novel mixtures shown in Examples 3 to 5. In this series of experiments, the maximum ion action, $A_{max}$, was about 140%.

Example 1a

| Concentration [ppm] | | Dispersion action |
|---|---|---|
| A1 | B1 | A [%] |
| 113 | 38 | 118 |
| 113 | 0 | 0 |
| 0 | 38 | 0 |

Example 1b

| Concentration [ppm] | | Dispersion action |
|---|---|---|
| A1 | B1 | A [%] |
| 128 | 22 | 51 |
| 128 | 0 | 0 |
| 0 | 22 | 0 |

Example 2

| Concentration [ppm] | | Dispersion action |
|---|---|---|
| A1 | B2 | A [%] |
| 113 | 38 | 116 |
| 113 | 0 | 0 |
| 0 | 38 | 0 |

| Example No. | Mixture | Dispersion action A [%] |
|---|---|---|
| 3 | 75 ppm A1 + 75 ppm B1 | 137 |
| 4 | 113 ppm A1 + 38 ppm B2 | 79 |
| 5 | 120 ppm A3 + 15 ppm B1 + 15 ppm nonylphenol-formaldehyde resin | 138 |

Testing of the Effectiveness of Asphaltene Dispersants

Principle of the Dispersion Test

This test is based on the fact that asphaltenes are soluble in aromatic hydrocarbons, but not aliphatic hydrocarbons. Dispersants can therefore be tested by dissolving the oil or extracted asphaltenes in an aromatic solvent and then adding an aliphatic hydrocarbon in order to produce a precipitate. Since asphaltenes have a dark color, the extent of the precipitate can be determined by a colorimetric measurement of the supernatant liquid. The darker the supernatant liquid, the more asphaltenes remain dispersed, ie. the better the dispersant. This test is described in CA-A-2,029,465. In on of the test, the precipitation medium is selected so that the asphaltenes precipitate predominantly, but not completely.

Dispersion Test Procedure
a) A 25% strength oil solution in toluene is filtered in order to remove impurities;
b) 9.5 ml of heptane as precipitant for asphaltenes and 0.5 ml of toluene/dispersant mixture (25:1) are introduced into a graduated glass tube with a capacity of a good 10 ml and shaken well. This corresponds to a dispersant concentration of 2000 ppm. If necessary, the amount of dispersant can be varied. For the blank samples, pure toluene is used;
c) 0.1 ml of the filtered oil solution is then added to the glass tube and likewise shaken well;
d) the sample is left to stand for 2 hours without vibrations. The precipitated asphaltenes should be able to collect at the base of the tube;
e) after expiry of this time, the sediment volume is estimated with reference to the graduation, the appearance of the entire sample is recorded, and then 1 ml of the supernatant phase is carefully removed using a pipette;
f) the amount removed is dissolved in 5 ml of a 99:1 toluene/triethanolamine mixture and measured photometrically at 600 nm.

Assessment of the Dispersion Test

The following expression is used as a relative measure of dispersion:

$$A = 100(D - D_0)/D_0,$$

where $D$ and $D_0$ are the optical density of the measurement solution and the blank sample respectively. The maximum possible value of $A$, $A_{max}$, corresponds to complete dispersion of the asphaltenes. It can be estimated by carrying out an experiment with dispersant with toluene instead of heptane. The asphaltenes then remain fully dispersed. The sediment volume supplies further information on the effectiveness of the dispersant. The smaller the amount of sediment, the better the sample dispersion.

What is claimed is:

1. A mixture of
   A from 5 to 99% by weight of a carboxylic acid having more than 4 carbon atoms, an ethercarboxylic acid containing $C_{18}-C_{22}$-alkyl, $C_{18}-C_{22}$-alkenyl or $C_6-C_{18}$-alkylaryl substituents, an amidocarboxylic acid, or mixtures thereof,
   B from 1 to 95% by weight of a phosphoric mono- or diester, or mixtures thereof, which is substituted by $C_{18}-C_{22}$-alkyl, $C_{18}-C_{22}$-alkenyl, $C_6-C_{18}$-alkylaryl or alkoxylated groups,
   where the sum of components A and B is 100% by weight.

2. A mixture as claimed in claim 1, wherein component B includes a phosphoric ester which has been ethoxylated with up to 20 mol, in particular from 1 to 10 mol, of ethylene oxide.

3. A mixture as claimed in claim 1, wherein component B includes a phosphoric ester carrying alkyl or alkenyl substituents having a chain length of from 10 to 20, in particular from 12 to 18, carbon atoms.

4. A mixture as claimed in claim 1, wherein component B includes a phosphoric ester carrying alkylaryl substituents derived from benzene or naphthalene.

5. A mixture as claimed in claim 1, wherein component A includes a carboxylic acid containing from 8 to 22, in particular from 12 to 18, carbon atoms.

6. A mixture as claimed in claim 1, wherein component A includes an ethercarboxylic acid which has been ethoxylated with up to 20 mol, in particular from 1 to 10 mol, of ethylene oxide.

7. A mixture as claimed in claim 1, wherein component A includes a sarcoside of the formula

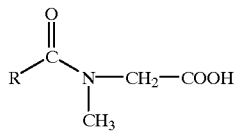

in which R is $C_7-C_{21}$-, preferably $C_{11}-C_{17}$-alkyl or -alkenyl.

8. A crude oil or a product derived therefrom, containing a mixture as claimed in claim 1.

9. A process for dispersing asphaltenes in crude oils and products derived therefrom, which comprises adding a mixture as claimed in claim 1 to the crude oil or the product derived therefrom.

* * * * *